United States Patent [19]
Briancon et al.

[11] Patent Number: 5,883,580
[45] Date of Patent: Mar. 16, 1999

[54] GEOGRAPHIC-TEMPORAL SIGNIFICANT MESSAGING

[75] Inventors: Alain Charles Louis Briancon, McKinney; Terence Edward Sumner, Azle, both of Tex.

[73] Assignee: Motorola, Inc., Schaumburg, Ill.

[21] Appl. No.: 822,024

[22] Filed: Mar. 24, 1997

[51] Int. Cl.[6] ........................................... G08B 5/22
[52] U.S. Cl. ........................... 340/825.44; 340/825.49; 340/825.52
[58] Field of Search ................ 340/825.44, 825.47, 340/825.46, 309.4, 309.15, 311.1, 825.49, 825.22; 455/33, 34, 31, 32, 38, 432, 433, 440

[56] References Cited

U.S. PATENT DOCUMENTS

| | | | |
|---|---|---|---|
| 5,225,826 | 7/1993 | DeLuca et al. | 340/825.44 |
| 5,254,986 | 10/1993 | DeLuca | 340/825.44 |
| 5,504,476 | 4/1996 | Marrs et al. | 340/825.44 |
| 5,539,395 | 7/1996 | Buss et al. | 340/827 |
| 5,600,312 | 2/1997 | Willard et al. | 340/825.47 |

*Primary Examiner*—Michael Horabik
*Assistant Examiner*—Jean B. Jeanglaude
*Attorney, Agent, or Firm*—Pablo Meles; Charles W. Bethards

[57] ABSTRACT

A messaging device for receiving a plurality of messages that have a relevancy status includes a selective call receiver (22) for receiving the plurality of messages, the relevancy status, and updates to the relevancy status, a memory (30) for storing at least a portion of the plurality of messages and the updates to the relevancy status and a processor (24, 40 and 28) for processing the portion of the plurality of messages that have received updates to the relevancy status. The relevancy status is ideally a location identifier and could additionally include a valid time indication.

20 Claims, 3 Drawing Sheets

5,883,580

GEOGRAPHIC-TEMPORAL SIGNIFICANT MESSAGING

FIELD OF THE INVENTION

This invention relates in general to selective call messaging devices and more specifically to messaging devices that process messages logically for a user in the context of space and time.

BACKGROUND OF THE INVENTION

Information services can be temporal as well as spatial in nature. Sending information about highway traffic for example is relevant to a pager user only if the user is in or near the market where the traffic problem exists and if the message is read within several hours of the report of the traffic problem. For instance, if the pager receives the message "635 backed up to stadium" while in Dallas and then the user arrives in Denver, the user reading this information would not obtain any value from this message. Likewise, if the user receives the same message, but reads the message 5 hours later, the message would be of little value and occupy memory space that could be used for other more pertinent messages. A pager that accounts for the temporal nature of messages is described in U.S. Pat. No. 5,225,826, assigned to Motorola, Inc. and entitled "Variable Status Receiver", this patent hereby incorporated by reference. Thus, a need exists for an intelligent messaging device that is able to distinguish messages that are solely spatially sensitive or both time and space sensitive and that further logically processes such messages in accordance with the actions of the user.

SUMMARY OF THE INVENTION

In a first aspect of the present invention, a method processing spatially sensitive information at a selective call receiver comprises the steps of receiving the spatially sensitive information along with an associated identifier and storing the spatially sensitive information if the associated identifier is valid. When a change is detected in the associated identifier as the selective call receiver roams from a first area to a second area, the selective call receiver process the spatially sensitive information.

In a second aspect of the present invention, a messaging device for receiving a plurality of messages with a portion of the messages having a relevancy status comprises a selective call receiver for receiving the plurality of messages, the relevancy status for the portion of the plurality of messages, and updates to the relevancy status, a memory for storing at least a portion of the plurality of messages and the updates to the relevancy status, and a processor for processing the portion of the plurality of messages that have received updates to the relevancy status.

In a third aspect of the present invention, a messaging device for receiving a plurality of messages having at least a portion with a location identifier comprises a selective call receiver for receiving the plurality of messages, the location identifier for the portion of the plurality of messages, and updates to the location identifier, a first memory location for storing a list of existing location identifiers, a second memory location for storing at least a portion of the plurality of messages, the location identifier for the portion of the plurality of messages, and the updates to the location identifiers, and a processor for processing the portion of the plurality of messages that have a location identifier by comparing the first memory location with the second memory location.

DETAILED DESCRIPTION

A messaging device for receiving a plurality of messages wherein at least a portion of the plurality of messages have a relevancy status comprises a selective call receiver for receiving the plurality of messages with the relevancy status as well as updates to the relevancy status. The messaging device further preferably comprises a memory for storing at least a portion of the plurality of messages and the updates to the relevancy status and a processor for processing the portion of the plurality of messages that have received updates to the relevancy status. Preferably the relevancy status is a location identifier or a valid time period indicator or a combination of location and time indicators. The location identifier is preferably selected from the group consisting of Simulcast System Identifier (SSID), Network Identifier (NID), Service Provider Identifier (SPID), Zone Identifier, Subzone Identifier, market indicator, information identifier, transmitter colorcode or prohibited location indicator. Some of these identifiers will be used with Motorola's FLEX™ or ReFLEX™ roaming paging protocol. The relevancy status can make up a portion of a receiver's address or can be another part of the message received. In any event, the messaging device must be able to determine its location either explicitly (as with location identifiers) or implicity as can be contemplated within the scope of the present invention. (For example, if only a particular frequency or modulation scheme is used in a particular area, then the location of the received signal can be implicitly determined.) With respect to time and the processing of time-based decisions, the messaging device may have the ability to derive time from the over-the-air protocol it receives (again, such as Motorola's synchronized FLEX™ or ReFLEX™ protocols), but alternatively the messaging device may also derive time from a real time clock. Further, it is contemplated within the present invention that the messaging device can be a one-way or a two-way selective call receiver.

Figure 1:
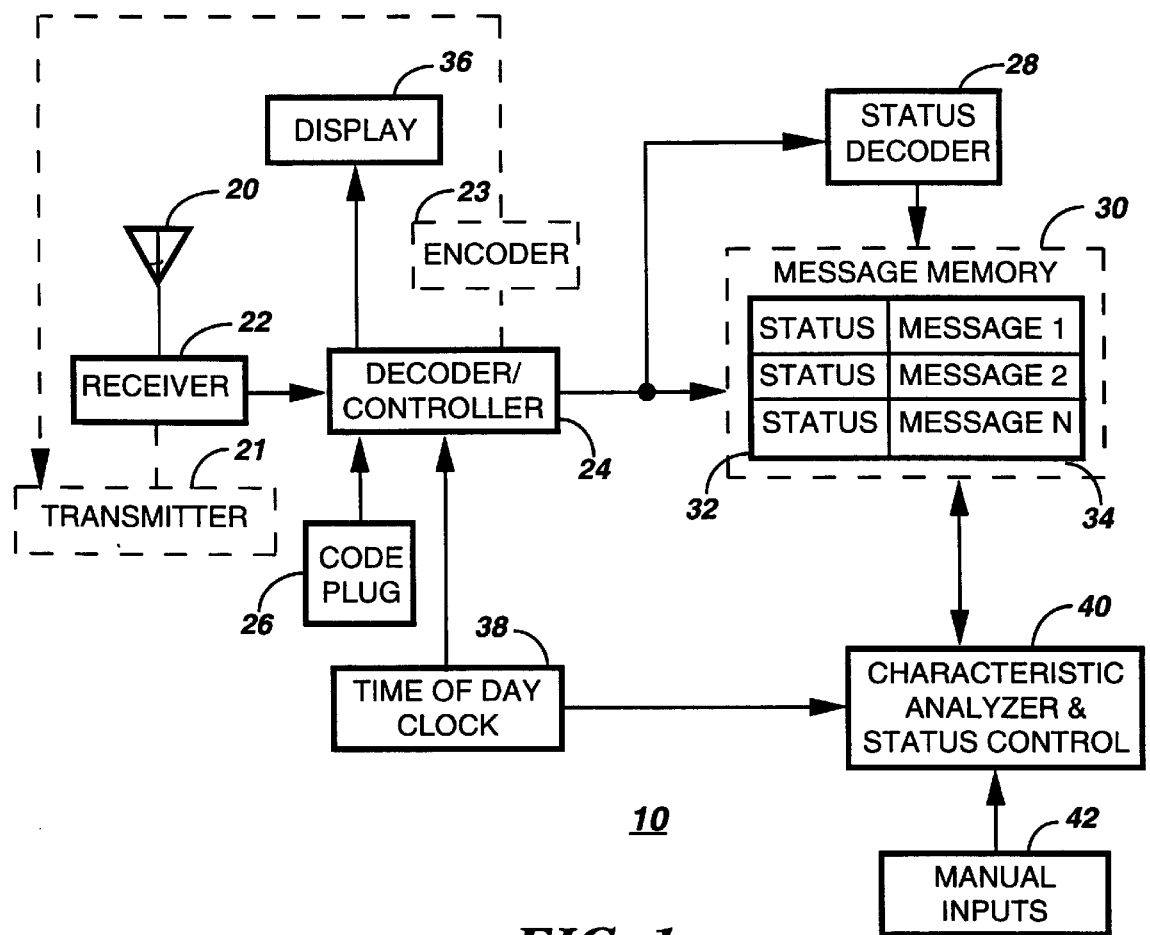
FIG. 1 is a block diagram of a messaging device in accordance with the present invention.
Figure 3:
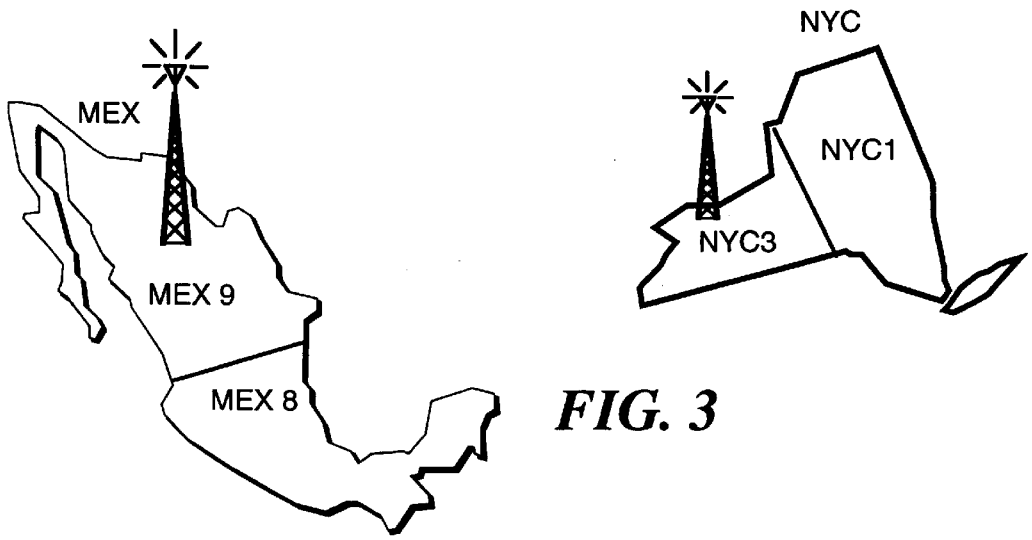
FIG. 3 is a representation of locations used in system in accordance with the present invention.

In accordance with the present invention and with reference to FIG. 1, a messaging device for receiving a plurality of messages that have a location identifier in at least a portion of the messages comprises a selective call receiver for receiving the plurality of messages as well as updates to the location identifiers. The messaging device further comprises a first memory location used for storing a list of existing location identifiers and a second memory location used for storing at least a portion of the plurality of messages, the associated location identifier for the portion of the plurality of messages, and the updates to the location identifiers. The messaging device further comprises a processor for processing the portion of the plurality of messages that have a location identifier by comparing the first memory location with the second memory location. Preferably the messaging device is a one-way selective call receiver or a two-way selective call transceiver and the processor stores a message and enables the display of the message if a match is found between the existing location identifiers and the location identifier associated with the message.

Alternatively, if desired, the messaging device may be programmed to find prohibited location indicators. In such a case, a processor does not store (or does not display or does not display portions as desired of) a message if a match is found between the existing location identifiers and the location identifier associated with the message. In another embodiment, the messaging device's processor can delete an existing message from the second memory if a match is found between the existing location identifiers and the location identifier associated with the message.

Again, FIG. 1 illustrates a selective call receiver 10 or alternatively a transceiver (with receiver 22 and transmitter 21) operatively constructed in accordance with the present invention. This receiver or transceiver is preferably associated with a paging system having a base station transmitter and terminal. The receiver responds to control data information from the base station terminal and in turn stores and provides data messages to a user during operation.

Radio frequency modulated selective call paging signals are received at antenna 20, demodulated by receiver 22 and decoded by decoder 24. Alternatively, the transceiver can further encode messages and/or control signals via encoder 23 and transmit messages or control signals via the transmitter 21 and antenna 20. Decoder 24 compares address signals within the selective call signal with at least one predetermined address signal stored within the code plug 26. In response to detecting an address assigned to the pager, a message signal following the address is processed. Status decoder 28 determines if the message signal includes status and timing information and stores the information in a status area 32 within message memory 30. If no initial status information is included, a default status is assigned to the message. The status decoder 28 may additionally make a decision on whether a message should be stored at all. Thus, the decoder 24 can decode a valid or target address, yet the status decoder 28 can still find an invalid status (such as invalid time or an invalid location) and direct the messaging device to not store the message (or alternatively store and not display the message). If the address and status is valid, then the message information is stored in a message area 34 within message memory where each message has a corresponding status signal. The pager also has a display 36 for displaying message information as well as time of day information as determined by a time of day clock 38. Alternatively, a pager using Motorola's FLEX™ family of paging protocols can derive the time from the synchronized frame information inherently available from over the air messaging using the protocol itself and store the time information where appropriate. The time of day clock 38 may also provide day and date information and is capable of generating alarms in response to the time of day being equal to a time set by various functions of the pager. The status of messages stored in message memory may be changed by a characteristic analyzer and status controller 40 in response to the time of day clock 38 or in response to geographic information received in memory 30 or in response to a combination of the time and geographic information. Additionally, the status of a message stored in message memory can be changed under manual control from manual inputs 42 which may include a plurality of buttons for manually operating various functions of the pager. The device 40 is preferably a memory location containing at least an algorithm similar to the one outlined in FIG. 2 as will be described. Decoder 24 further analyzes the status assigned to a received message and the status of messages stored in the message memory 30 and determines which messages if any are to be deleted in order to store the message, or if the received message will be stored. It should also be understood that it is within contemplation of the present invention to have location and other identifiers determined by any source, not just from the same channels that provide the messaging information. Thus, if the device 10 further provided a means for a GPS received signal, such information could be used to provide processing of messages within context of location.

Figure 2:
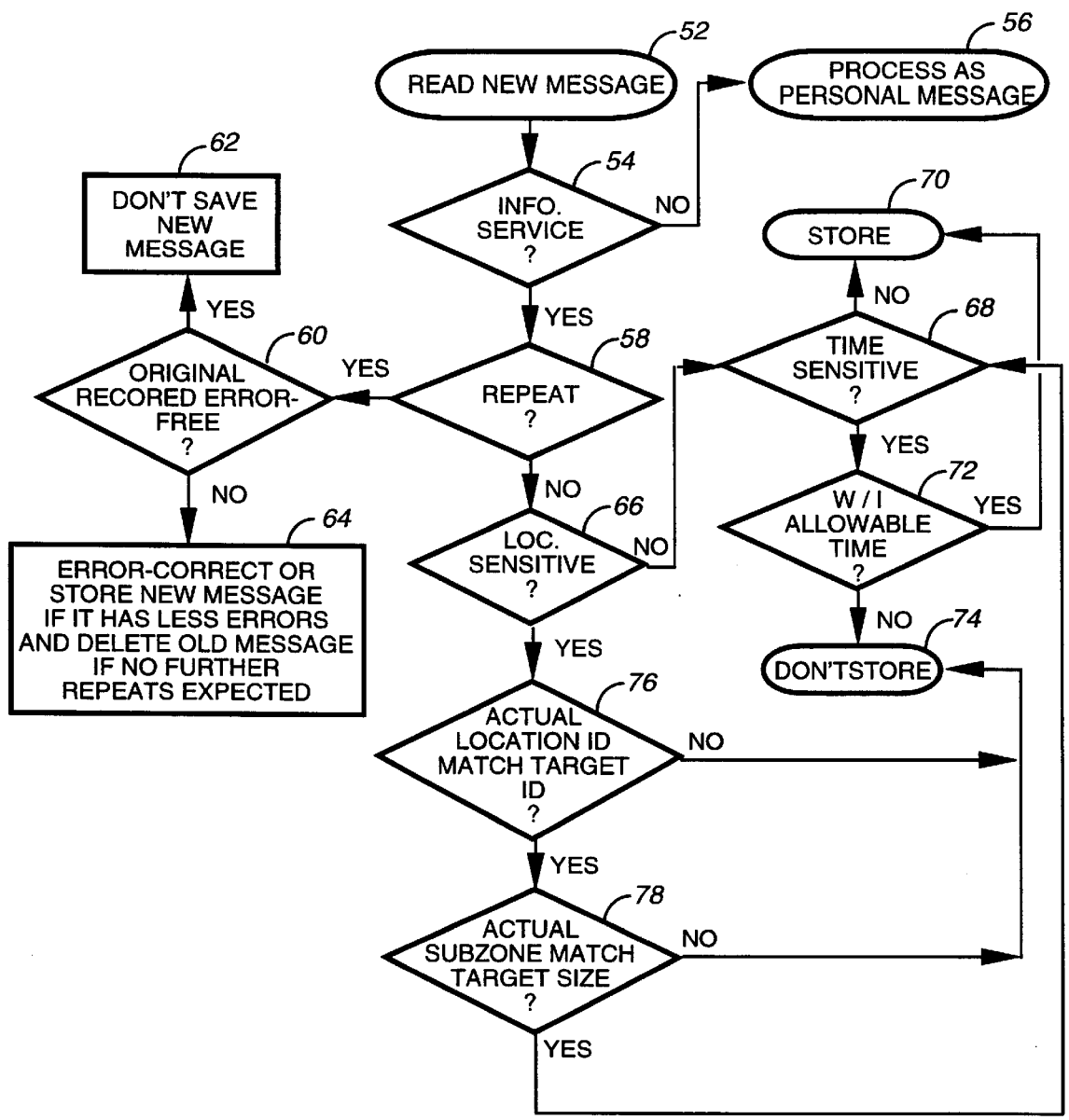
FIG. 2 is a flow chart of an algorithm illustrating a method in accordance with the present invention.

Referring to FIG. 2, an algorithm 50 in accordance with the present invention is shown. A selective call receiver or transceiver receives a new message and decodes or reads the new message at step 52. With particular reference to paging, receipt of messages are typically treated differently dependent upon whether a message is a personal message or an information services message. More likely than not, information services messages will only have a particular relevancy during a given period or for a particular geographic location. The present invention certainly contemplates that personal messages would be within the scope of the claimed invention, but information services messages are merely used here as a clear example. Thus, at step 54, the selective call receiver may detect if the message is an information services message. If not, the message can be treated as a personal message at step 56. If the message is an information services message, then the algorithm may determine if the message is a repeat message at step 58. If the message is a repeat message, then an inquiry is made to see if the original message was received without errors at step 60. If no errors existed in the original message, then the new message is not saved as shown in step 62. If errors existed in the original message at step 60, then several options could be implemented. A first option could include error correcting the original message with information from the repeat message. Another option could include storing the new message if the new message has less errors than the original message. Further, the original message could be deleted, particularly if no further repeats were expected. If the message is not a repeat message, then it is determined if the message is location sensitive at step 66. If the message is not location sensitive at step 66, then it is determined if the message is time sensitive at step 68. If the message is not time sensitive, then the message is stored at step 70. If the message is time sensitive, then it is determined if the message received exists within a valid time period at step 72. If the time appears valid, then the message is stored at step 70. If the time is invalid, then the message is not stored as shown at step 74. Alternatively (not shown), the message could be stored, but not displayed. In another alternative, the message is stored and only portions (that were considered valid) of the message is displayed.

If the message is location sensitive at step 66, then a match for a location identifier is sought at step 76. Alternatively, a subzone or sub-location match may be sought as well as shown in step 78. The location identifier and sub-locations can come in many variants including Simulcast System Identifier (SSID), Network Identifier (NID), Service Provider Identifier (SPID), Zone Identifier, Subzone Identifier, market indicator, information identifier, transmitter colorcode as well as prohibited location indicator to name a few. If no location match is indicated, then the message will not be stored at step 74. If a location match is indicated, then an inquiry into time validity is done at step 68 as previously described above.

Figure 4:
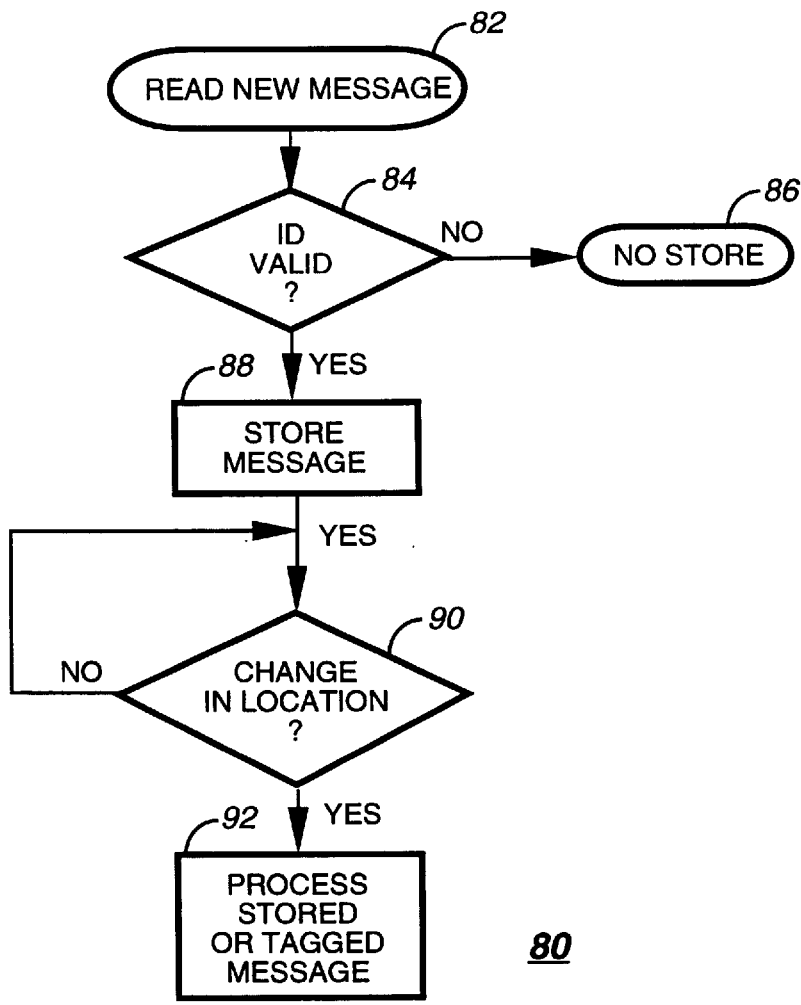
FIG. 4 is another flow chart of an algorithm illustrating a method in accordance with the present invention.

Operationally, a method 80 (with reference to FIG. 4) of processing spatially sensitive information at a selective call receiver in accordance with the present invention preferably comprises the steps of receiving (82) the spatially sensitive information along with an associated identifier and storing (88) the spatially sensitive information if the associated identifier is valid. If at decision block 84, it is determined that the identifier is invalid, then the message is not stored (86). Then, the method continues by detecting a change in the associated identifier at decision block 90 as the selective call receiver roams from a first area to a second area. If a change is detected, then, the spatially sensitive information is processed at step 92. Preferably, such processing includes deleting at least a portion of the spatially sensitive information which is not relevant to the second area. Alternatively, processing of such messages could include storing a message and deleting such message until a later time when the memory management scheme of the pager determines that the message should be deleted. A memory management scheme could include automatically deleting at least portions of the spatially sensitive information when the memory of the selective call receiver is filled beyond a threshold level and otherwise deleting such portions of the spatially sensitive information when the user prompts the selective call receiver to display a message or delete messages or portions thereof upon other events at the messaging device as could be reasonably contemplated. In another alternative, the selective call receiver could delete at least portions of the spatially sensitive information when a user prompts the selective call receiver to display at least portions of the spatially sensitive information.

In another embodiment, a method of processing a message among a plurality of messages received over the air at a selective call receiver comprises the steps of receiving the plurality of messages wherein at least a portion of the messages have a relevancy status that includes a space/time indicator. The messages are stored if the relevancy status matches a stored relevancy status at the selective call receiver. When the space/time indicator changes, the method then tags the messages for processing and then the tagged messages are processed. Such change in the space/time indicator can be a change in location or a change in time beyond a predefined threshold period. Such processing could include the step of deleting messages that have an invalid space/time indicator.

Ten messages are provided below in a table as an example of how a selective call receiver might operate in accordance with an embodiment of the present invention. Each message in the table provides one or more bits of status information: Address (whether personal or information services); location identifiers, sub-location identifiers, time (either derived from the protocol or a real time clock); a spatial or time sensitive message or a message that is both time and space sensitive; and a stale time indicator. The target location identifier and the target sub-location identifier could be location identifiers already stored in memory (such as a look-up table) in the messaging device. The process column describes what process the messaging device performs based on the relevancy status received.

|   | ADDR | LOC ID | SUB LOC ID | TIME | MESSAGE | TARGET LOC. ID | TARGET SUB LOC ID | STALE TIME | PROCESS |
|---|---|---|---|---|---|---|---|---|---|
| 1 | INFO | A | A1 | 1 PM | 10% off by showing pager before closing | A | A1 | 5 PM | STORE/ ALERT |
| 2 | INFO | A | A1 | 10 AM | sales force meeting @ noon | A | A2 | 12:30 | STORE/ ALERT |
| 3 | INFO | A | A1 | 10 AM | sales force meeting @ noon | B | B5 | 12:30 | NO STORE/ NO ALERT |
| 4 | INFO | A | A1 | 10 AM | sales force meeting @ noon | A | A1 | 12:30 | STORE/ ALERT 5 MINS B/F MEETING |
| 5 | INFO | A | A1 | 1 PM | sales force meeting @ noon | A | A1 | 12:30 | DELETE OLD PAGE |
| 6 | INFO | NYC | NYC1 | 3 AM 7/4/99 | Avoid NYC, Riot 48 hr curfew | NYC | NYC1 | 3 AM 7/6/99 | STORE/ ALERT |
| 7 | INFO | NYC | NYC3 | 3 AM 7/4/99 | Avoid NYC, Riot 48 hr curfew | NYC | NYC1 | 3 AM 7/6/99 | STORE/ ALERT |
| 8 | INFO | MEX | MEX9 | 7 AM 7/4/99 | Avoid NYC, Riot 48 hr curfew | NYC | NYC1 | 3 AM 7/6/99 | DO NOT DISPLAY & DELETE |
| 9 | OVERRIDE 1 | MEX | MEX9 | 3 AM 7/4/99 | Avoid NYC, Riot 48 hr curfew | NYC | NYC1 | 3 AM 7/6/99 | STORE/ AUTO DISPLAY |
| 10 | OVERRIDE 2 | MEX | MEX9 | 3 AM 7/4/99 | Avoid NYC, Riot 48 hr curfew | NYC | NYC1 | 3 AM 7/6/99 | STORE/ NO AUTO DISPLAY |

In message 1, the location and sub-location identifiers match and the message received is during a valid time period, therefore the message is stored and the user is alerted. Message 1 represents an example of a message that a retail store could send to encourage customers to buy within a certain time period. In message 2, the sub-location does not match, but the messaging device can still be programmed to store and alert the user, particularly if the sub-location identifier appears to be adjacent to the target sub-location identifier. In message 3, the location identifiers do not match and therefore the message is preferably not stored. In message 4, the location identifiers match and the time is valid, but the pager is alternatively programmed to store the message and alert the user 5 minutes before the pertinent time as derived from the message. In this case, a meeting at 12am is indicated and the user would be alerted at 11:55am. In message 5, the time period is invalid. Thus, the pager could either delete the new message or alternatively (if the new message is a repeat) the old page could be deleted.

Message 6 has matching location and sub-location identifiers and is received during a valid time period. Thus, the message would be stored and the user alerted. Message 7, as shown in message 2, fails to show a matching sub-location identifier, but the messaging device can still be programmed to store and alert the user, particularly if the sub-location identifier appears to be adjacent to the target sub-location identifier. Message 8, as shown in message 3 fails to show matching location and sub-location identifiers, therefore the message is not retained if the message was previously received and stored. In fact, the messaging device could be specifically programmed to delete messages if the "NYC" location identifier is not indicated or specifically programmed to delete messages if the "MEX" is indicated. Message 9 and 10 merely show examples of "override" type messages that would store and automatically display (or alternatively store and not display in the case of message 10) regardless of what location identifiers and time indicators are received at the messaging device.

In another aspect of the present invention, an address list containing a target address and corresponding valid location indication could be stored within a memory location in a messaging device. The memory location could contain the exemplary look-up table found below:

| TARGET/ADDRESS | WHERE VALID |
| --- | --- |
| 123 | A |
| 456 | A,B |
| 987654 | everywhere |
| 789 | ALL but E |

Preferably, the messaging device would first determine its current location and then enable its target addresses. Subsequently, the messaging device would store messages for the enabled targets and otherwise ignore messages for its disabled targets. This look-up table could handle the storage mechanism of the device.

As an example, a messaging device that recognizes its location as being location "A" or location "B" which further receives a message with a target address of "456" would store this particular message. If the messaging device recognizes its location as being something other than location "A" or "B", then the message is not stored. As another example, if the messaging device is in location "A" and receives a message with a target address of "789", then the message is stored. If the same message with the target address of "789" were received in a location the messaging device recognizes as location "E", then the message would not be stored.

In addition to the storage scheme described above, the messaging device would preferably have a display algorithm for messages already stored that could be controlled by a separate look up table such as the following:

| LOCATION | MESSAGE | DISCARD | ALERT | DISPLAY |
| --- | --- | --- | --- | --- |
| A | 1 |  | ✓ | ✓ |
| B | 2 |  | X | ✓ |
| C | 3 |  |  |  |
| D | 4 |  | X | X |
| E | 5 | ✓ |  |  |
| NOT F | 6 | ✓ |  |  |

Thus, in accordance with the look-up table above, a messaging device entering location "A" would alert the user and display message 1. The user of a messaging device entering location "B" can see message 2, but the user would not be alerted. In another instance, a user of a messaging device entering location "D" will not be alerted and will not be able to display message 4. Depending upon the algorithm, message 4 may then subsequently be displayed when the messaging device recognizes that it is not within location "D". Further in accordance with the table above, the messaging device would discard message 5 upon recognition by the messaging device of its presence in location "E". Likewise, message 6 would be discarded upon recognition by the messaging device of a location other than location "F".

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method of processing spatially sensitive information at a selective call receiver, comprising the steps of:

receiving the spatially sensitive information along with an associated identifier;

storing the spatially sensitive information if the associated identifier is valid;

detecting a change in the associated identifier as the selective call receiver roams from a first area to a second area; and processing the spatially sensitive information.

2. The method of claim 1, wherein the method further comprises the step of deleting at least portions of the spatially sensitive information.

3. The method of claim 1, wherein the method further comprises the step of at least displaying portions of the spatially sensitive information.

4. The method of claim 1, wherein the method further comprises the step of deleting at least portions of the spatially sensitive information when the user prompts the selective call receiver to display at least portions of the spatially sensitive information.

5. The method of claim 1, wherein the method further comprises the step of automatically deleting at least portions of the spatially sensitive information when the memory of the selective call receiver is filled beyond a threshold level and otherwise deleting said at least portions of the spatially sensitive information when the user prompts the selective call receiver to display a message.

6. A method of processing a message among a plurality of messages received over the air at a selective call receiver, comprising the steps of:

receiving the plurality of messages, at least a portion of the messages being received with a relevancy status that includes a space/time indicator, storing the messages if the relevancy status matches a stored relevancy status at the selective call receiver;

tagging the messages for processing when the space/time indicator changes; and processing the messages that were tagged, the step of processing further comprises the step of deleting e that have an invalid space/time indicator.

7. The method of claim 6, wherein the step of tagging further comprises the step of tagging the messages when the space/time indicator indicates a change in location.

8. The method of claim 6, wherein the step of tagging further comprises the step of tagging the messages when the space/time indicator indicates a change in time beyond a threshold period.

9. The method of claim 6, wherein the step of processing further comprises the step of displaying at least portions of the messages that were tagged.

10. A messaging device for receiving a plurality of messages, at least a portion of the plurality of messages having a relevancy status, the messaging device comprising:

a selective call receiver for receiving the plurality of messages, the relevancy status for the portion of the plurality of messages, and updates to the relevancy status;

a memory for storing at least a portion of the plurality of messages and the updates to the relevancy status; and a processor for processing the portion of the plurality of messages that have received updates to the relevancy status.

11. The messaging device of claim 10, wherein the relevancy status is a location identifier.

12. The messaging device of claim 11, wherein the location identifier is selected from the group consisting of Simulcast System Identifier (SSID), Network Identifier (NID), Service Provider Identifier (SPID), Zone Identifier, Subzone Identifier, market indicator, information identifier, transmitter colorcode, and a prohibited location identifier.

13. The messaging device of claim 10, wherein the messaging device further comprises a real time clock.

14. The messaging device of claim 13, wherein the messaging device receives an address that includes the relevancy status, wherein the relevancy status is selected from the group consisting of Simulcast System Identifier (SSID), Network Identifier (NID), Service Provider Identifier (SPID), Zone Identifier, Subzone Identifier, market indicator, information identifier, transmitter colorcode, prohibited location identifier, and timeout indicator.

15. The messaging device of claim 10, wherein the messaging device further comprises a transmitter.

16. A messaging device for receiving a plurality of messages, at least a portion of the plurality of messages having a location identifier, the messaging device comprising:

a selective call receiver for receiving the plurality of messages, the location identifier for the portion of the plurality of messages, and updates to the location identifier;

a first memory location for storing a list of existing location identifiers;

a second memory location for storing at least a portion of the plurality of messages, the location identifier for the portion of the plurality of messages, and the updates to the location identifiers; and a processor for processing the portion of the plurality of messages that have a location identifier by comparing the first memory location with the second memory location.

17. The messaging device of claim 16, wherein the messaging device is a one-way selective call receiver and the processor stores a message and enables the display of the message if a match is found between the existing location identifiers and the location identifier associated with the message.

18. The messaging device of claims 16, wherein the messaging device is a one-way selective call and the processor does not store a message if a match is found between the existing location identifiers and the location identifier associated with the message.

19. The messaging device of claim wherein the messaging device is a one-way selective call and the processor deletes an existing message from the second memory if a match is found between the existing location identifiers and the location identifier associated with the message.

20. The messaging device of claim 16, wherein the messaging device further comprises a transmitter.

* * * * *

UNITED STATES PATENT AND TRADEMARK OFFICE
CERTIFICATE OF CORRECTION

PATENT NO. : 5,883,580
DATED : March 16, 1999
INVENTOR(S) : Briancon et al.

It is certified that error appears in the above-identified patent and that said Letters Patent is hereby corrected as shown below:

Column 9,
Line 6, please change "deleting e that" to -- deleting messages that --.

Column 10,
Line 36, please add "16" after the word claim and before wherein.

Signed and Sealed this

Seventh Day of May, 2002

*Attest:*

JAMES E. ROGAN
*Attesting Officer*     *Director of the United States Patent and Trademark Office*